United States Patent [19]

Leahy et al.

[11] Patent Number: 5,029,124

[45] Date of Patent: Jul. 2, 1991

[54] METHOD AND APPARATUS FOR PROVIDING HIGH SPEED PARALLEL TRANSFER OF BURSTS OF DATA

[75] Inventors: James N. Leahy, Boston; Kenneth D. Sills, Acton, both of Mass.

[73] Assignee: Digital Equipment Corporation, Maynard, Mass.

[21] Appl. No.: 195,049

[22] Filed: May 17, 1988

[51] Int. Cl.⁵ .......................... H04J 3/02; G06F 3/00
[52] U.S. Cl. ............................ 364/900; 370/85.1; 364/940.81; 364/937; 364/940
[58] Field of Search ............ 364/200 MS, 900 MS; 371/32, 33; 370/85.1, 85.2, 85.3, 85.4, 85.5, 85.11

[56] References Cited

U.S. PATENT DOCUMENTS

| | | | |
|---|---|---|---|
| 4,275,440 | 6/1981 | Adams, Jr. et al. | 364/200 |
| 4,280,193 | 7/1981 | Baun et al. | 364/900 |
| 4,534,011 | 8/1985 | Andrews et al. | 364/900 |
| 4,571,671 | 3/1986 | Burns et al. | 364/200 |
| 4,802,085 | 1/1989 | Levy et al. | 364/200 |
| 4,851,990 | 7/1989 | Johnson et al. | 1/200 |

FOREIGN PATENT DOCUMENTS

| | | | |
|---|---|---|---|
| 62-0217743 | 9/1987 | Japan | 371/32 |
| 0625311 | 8/1978 | U.S.S.R. | 371/32 |

*Primary Examiner*—James W. Moffitt
*Assistant Examiner*—Rebecca L. Rudolph
*Attorney, Agent, or Firm*—Finnegan, Henderson, Farabow, Garrett, and Dunner

[57] ABSTRACT

Method and apparatus for high speed parallel transfer of bursts of data between a device and an external interface bus. A burst mode asynchronous protocol is utilized, in which synchronous bursts of data using DATA VALID signals are followed by an asynchronous handshake using an ACKNOWLEDGE signal. The apparatus includes a burst register for storing and transmitting the data words in a burst, and control logic responsive to DATA VALID and ACKNOWLEDGE signals and providing control signals to operate the burst register.

33 Claims, 5 Drawing Sheets

METHOD AND APPARATUS FOR PROVIDING HIGH SPEED PARALLEL TRANSFER OF BURSTS OF DATA

FIELD OF THE INVENTION

The present invention relates to a data processing system and, more particularly, to high speed parallel transfer of bursts of data between separate devices in a data processing system.

BACKGROUND OF THE INVENTION

In order to transfer a large number of data words between two separate data processing devices in a data processing system, the devices must transmit and receive the data in accordance with a protocol, that is, a predetermined set of rules for data transfer. The performance of the system in interdevice transfers of data is improved when the protocol for these transfers allows for high speed, reliable transmission and reception, and an effective method of recovery from errors. It is desirable that such a protocol be implemented without the use of complex circuitry.

One method of transferring data is to use a completely asynchronous protocol. For this type of protocol, two control lines interconnecting the devices are used for interlocked signal exchange, or "handshaking." A completely asynchronous protocol makes use of two different signals: a DATA VALID (or DATA AVAILABLE) signal and an ACKNOWLEDGE signal. The device that is currently acting as the source or transmitter of a number of multibit data words asserts the DATA VALID signal on one of the two control lines; the device acting as the destination or receiver for the data words asserts the ACKNOWLEDGE signal on the other one of the control lines.

In this method, the source places a single multibit data word on the data lines interconnecting the source and destination devices. A time period is allowed for the data to be "de-skewed," i.e., to settle, and then the source device asserts a DATA VALID signal on the appropriate control line. The destination device waits for receipt of a DATA VALID signal from the source and uses the DATA VALID signal to "strobe in", or accept, the data present on the data lines. In this manner, a single multibit data word is transferred from the source to the destination.

After each data word has been received, the destination device asserts an ACKNOWLEDGE signal on the other control line. The ACKNOWLEDGE signal indicates to the source device that the data word currently on the data line has been properly received. In response to receipt of the ACKNOWLEDGE signal, the destination deasserts the DATA VALID signal and removes the data currently on the data lines. In response to deassertion of the DATA VALID signal by the source, the destination deasserts the ACKNOWLEDGE signal. This sequence completes a single cycle of data transfer, during which a single word of data is transferred from the source to the destination.

The completely asynchronous protocol is a relatively slow method of data transfer. Before each data word can be transferred, the data processing system is delayed for four transmission line time periods while waiting for handshaking signals to complete four trips along the control lines or cables interconnecting the devices, as DATA VALID and ACKNOWLEDGE signals are asserted and deasserted. Additionally, the source and destination devices generally use a synchronizing circuit to synchronize the handshaking signals with a state machine that is internally synchronized with the device.

Another data transfer method that can be used is a completely synchronous protocol. The completely synchronous protocol is very fast when compared with the completely asynchronous protocol, but requires complex circuitry to achieve such high speeds.

In the completely synchronous protocol, the source device places a single multibit data word on the data lines, and then asserts a DATA VALID signal on the appropriate control line. The source then deasserts the DATA VALID signal, and places the next data word on the data lines. The source continues asserting the DATA VALID signal as each data word is placed on the data lines until all the data words have been transmitted. At the destination device, the data words are received as fast as they are transmitted. The destination device must strobe in a new data word each time the DATA VALID signal is asserted. As a result, the destination device is unable to slow down the data flow from the source device.

Other synchronous protocols have been developed in order to provide some flow control between the two devices. In these protocols, the destination device can assert a TRANSMIT OFF signal in order to stop the transmission of data words by the source device. Thus, if a buffer in the destination device is filling up too rapidly with received data words, the TRANSMIT OFF signal is asserted to allow time for the circuitry in the destination device to catch up.

In systems using these synchronous protocols, flow control and error recovery are major problems. A primary reason for the difficulty in resolving these problems is the propagation delay associated with the lines or cables coupling the source and destination devices together. Thus, if the destination device detects a parity error in the received data or has a full data buffer, the source device is sent an indication of the condition (e.g., via an interrupt or a TRANSMIT OFF signal). However, by the time the source device receives this indication, additional data words have been transmitted because the source device does not wait for any ACKNOWLEDGE signal.

In these completely synchronous systems, there is no simple way for the source device to determine which was the last data word transmitted before the destination device requested that the transmission be stopped. If, for example, the source and destination devices are connected by a fifty-foot cable having a propagation delay of approximately 1.8 nanoseconds per foot, there will be a ninety nanosecond period before a signal asserted by one device is received by the other device. If each device uses, for example, an eighty nanosecond clock, the source device will take approximately eighty nanoseconds to transmit each data word. If a transmitted data word contains a parity error, it may take approximately twenty nanoseconds for the destination device to check the parity of the received data word. Additionally, at the source device, it may take approximately two clock cycles, or 160 nanoseconds, for the source device to interpret a TRANSMIT OFF signal or interrupt from the destination device and stop the data transmission. Therefore, in this example, it takes at least 90+20+90+160=360 nanoseconds from the time the data word containing the error is sent until further transmission is stopped. This means that four or five additional data words will be sent after the data word containing the error was transmitted (i.e., 360 nanoseconds divided by the eighty nanosecond data transfer period).

This example illustrates that additional time and software effort is needed in completely synchronous systems in order to recover from an error condition or to execute a transmission stop. If the destination device requests that the transmission be retried by the source device, the source device cannot determine how many data words to retransmit because it is unable to determine how many data words were received by the destination device. Typically, the data buffer in the destination device must be emptied in order to find the erroneous data word. The data buffer in the source device will also be cleared because additional data words were added until transmission was stopped. In addition to requesting a retransmission by the source device, the destination device will need to identify the location of the error using a word (or byte) count, and send this word count identification to the source device. Furthermore, a TRANSMIT OFF signal is ambiguous because of the lack of any ACKNOWLEDGE signals, requiring that the destination device provide some additional indication to the source device of the reason why transmission was stopped.

SUMMARY OF THE INVENTION

It is an object of the invention to provide high speed parallel transfer of bursts of data while minimizing the problems and deficiencies encountered by users of systems that implement conventional protocols.

It is therefore desirable to provide a method and apparatus for parallel transfer of bursts of data that is characterized by high speed, reliable transmission and reception, and an effective method of recovery from errors, and which can be implemented without the use of complex circuitry.

Additional objects and advantages of the invention will be set forth in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, there is provided a device for providing high speed parallel transfer of bursts of data between the device and an external interface bus, each burst including a predetermined number of data bits in a fixed number of multibit data words. The external interface bus includes a plurality of data lines, with each data line corresponding to one bit in a data word being transferred. The external interface bus also includes a first and second synchronizing line carrying ACKNOWLEDGE and DATA VALID signals, and a direction line. The device comprises transfer means for coupling the device to the external interface bus to transmit and receive signals on the data lines, synchronizing lines, and direction line; and burst register means coupled to the transfer means, including a plurality of storage elements equal to the predetermined number, for transmitting a single multibit data word from the storage elements to the data lines in response to a first control signal, and for storing a single multibit data word in the storage elements from the data lines in response to a second control signal. The device also includes control means coupled to the transfer means and the burst register means.

The control means provides a DIRECTION OUT signal to the transfer means for output to the direction line to enable transmission of a burst of data to the data lines, sequentially provides a plurality of first control signals equal to the fixed number of the burst register means to sequentially transmit each data word of the burst from the burst register means to the transfer means, and sequentially provides a plurality of DATA VALID signals equal to the fixed number to the transfer means for output to one of the synchronizing lines, each DATA VALID signal being provided to the transfer means after a corresponding data word in the burst is sequentially transmitted from the burst register means, to enable synchronous reception of each data word in the burst. The control means monitors the other synchronizing line and is responsive to assertion of an ACKNOWLEDGE signal on the other synchronizing line prior to transmission of the burst to prevent a first data word in the burst from being transmitted from the burst register means until after the ACKNOWLEDGE signal is deasserted.

The control means is also responsive to assertion of a DIRECTION IN signal on the direction line to enable storage of a burst from the data lines. The control means monitors one of the synchronizing lines, sequentially provides a plurality of second control signals equal to the fixed number to the burst register means, each second control signal being provided to the burst register means in response to assertion of a corresponding DATA VALID signal on the one synchronizing line to sequentially store each data word of the burst in the burst register means, asserts a single ACKNOWLEDGE signal on the other synchronizing line after receiving a DATA VALID signal corresponding to a first data word in the burst, and deasserts the ACKNOWLEDGE signal on the other synchronizing line after the predetermined number of storage elements in the burst register means are ready to store another burst of data.

The accompanying drawings, which are incorporated in and constitute a part of this specification, illustrate preferred embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

In the present invention, high speed parallel transfers of data are accomplished using a burst mode asychronous protocol. The invention is particularly well-suited for data acquisition by a data processing system, such as is required for flight simulators, high performance imaging for CT scanners or NMR, satellite telemetry, or intercomputer links.

In the burst mode asynchronous protocol, a small synchronous burst of data is followed by an asynchronous handshake. In this manner, the data transfer speed approaches that of completely synchronous protocols, but flow control is simple and any error conditions are well-bounded.

A burst of data consists of two or more data words. The number of data words in the burst is selected to be some fixed number, such as sixteen or thirty-two. The data words themselves each consist of multiple data bits, typically thirty-two per data word (also referred to as a longword). As a result, each burst of data includes a predetermined number of bits of information. Thus, when each burst consists of sixteen words, and each word consists of thirty-two bits (i.e., four bytes), there will be 512 bits in each synchronous burst of data.

Figure 1:
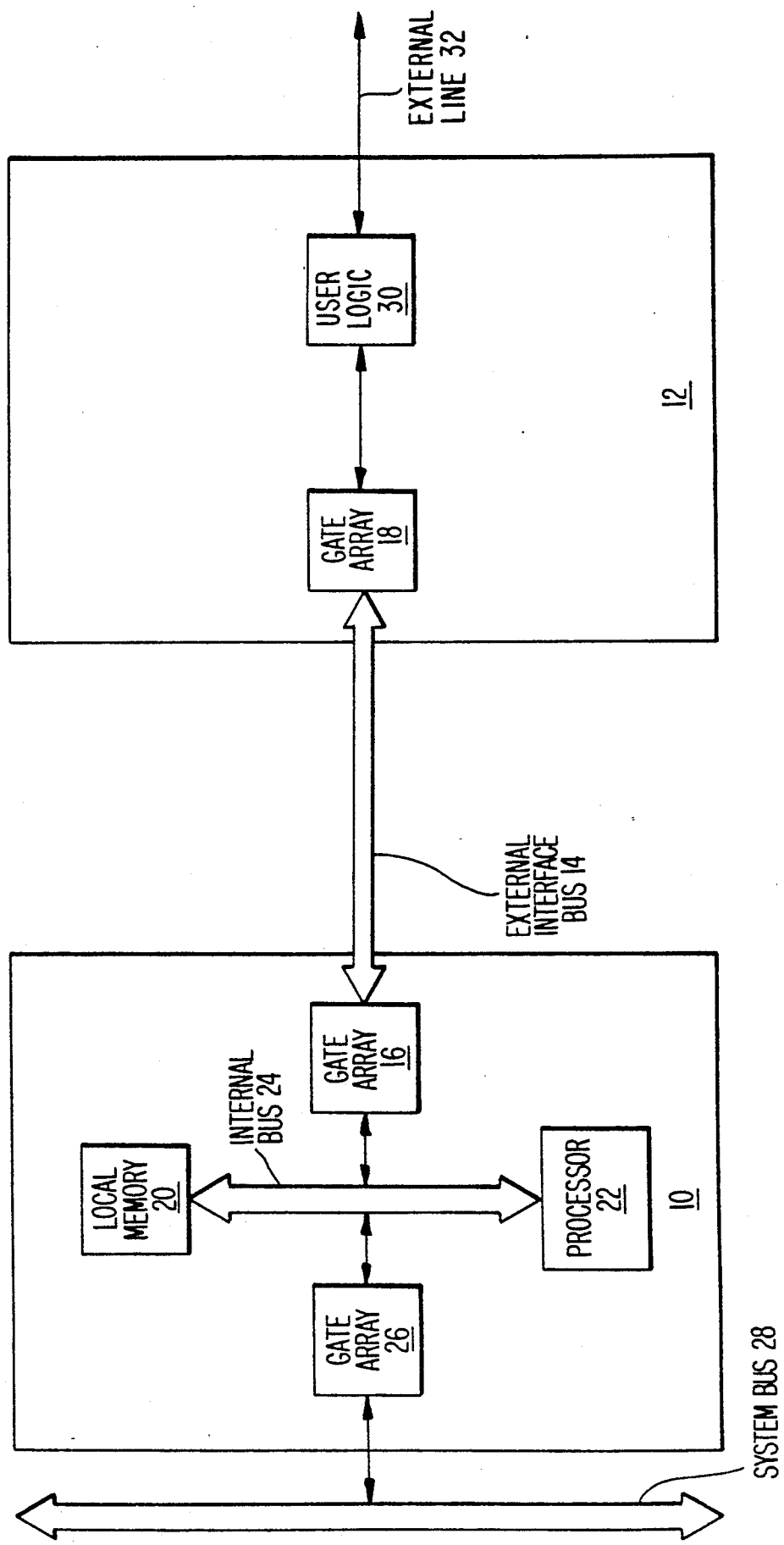
FIG. 1 is a general block diagram of a system incorporating devices accordance with the present invention.

In the system shown in FIG. 1, a first device 10 and a second device 12 are interconnected by an external interface bus 14. First and second devices 10 and 12 respectively include gate arrays 16 and 18 for interfacing the devices to bus 14. Device 10 may include a local memory 20 and a processor 22 coupled to gate array 16 via an internal bus 24. Another gate array 26 is provided in device 10 to interface the device with a system bus 28. The system bus allows device 10 to utilize and communicate with other resources in the data processing system, such as processors, memories, and I/0 devices (not shown). One preferred method by which device 10 can obtain access to system bus 28 is described in U.S. patent application Ser. No. 044,470, which was filed on May 1, 1987 by Darrel Donaldson and Richard Gillette, and assigned to Digital Equipment Corporation, the assignee of the present invention. Device 12 may include user logic 30. User logic 30 may provide a communications interface between device 12 and an external line 32.

External interface bus 14 includes a number of data lines, with each data line corresponding to one bit in a data word being transferred. External interface bus 14 also includes a first and second synchronizing line carrying ACKNOWLEDGE and DATA VALID signals, and at least one direction line. The bus may further include at least one parity line carrying a parity bit to indicate the parity of a multibit data word on the data lines.

Figure 2:
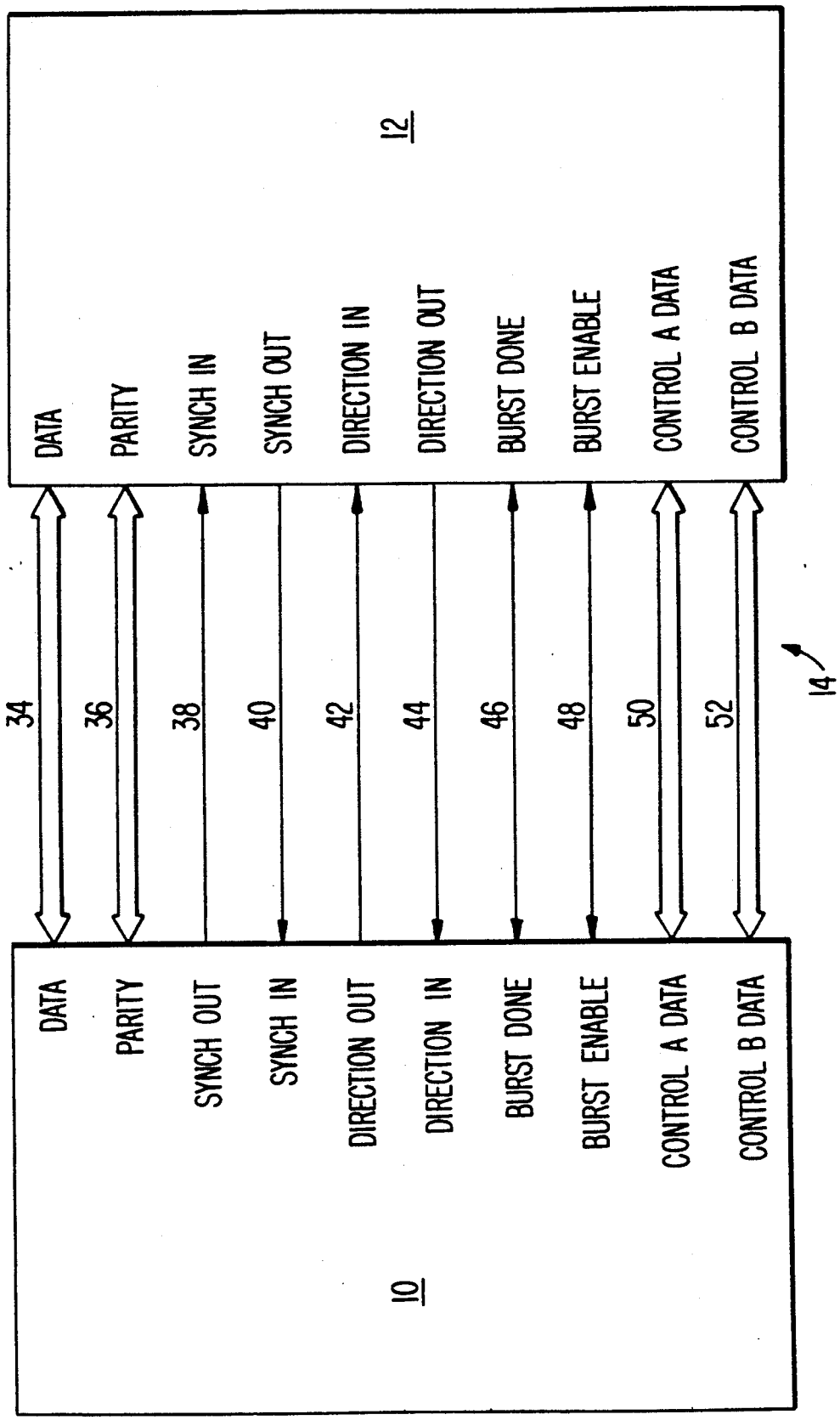
FIG. 2 is a schematic diagram of a preferred embodiment of an external interface bus interconnecting devices constructed in accordance invention.

FIG. 2 shows a preferred embodiment of external interface bus 14 interconnecting devices 10 and 12. In this embodiment, there are thirty-two bidirectional data lines 34, one for each bit in a thirty-two bit data word transferred between devices 10 and 12, and four parity lines 36. Unidirectional first and second synchronizing lines 38 and 40 are provided, with first synchronizing line 38 carrying DATA VALID signals when first device 10 is the source, and carrying ACKNOWLEDGE signals when device 10 is the destination. Similarly, second synchronizing line 40 carries DATA VALID signals when second device 12 is the source, and carries ACKNOWLEDGE signals when device 12 is the destination. Therefore, in this embodiment, first synchronizing line 38 is an output line for first device 10, whereas second synchronizing line 40 is an output line for second device 12.

In another embodiment, the first and second synchronizing lines may be bidirectional, in which case one line is dedicated to bidirectional transfer of DATA VALID signals, and the other line is dedicated to bidirectional transfer of ACKNOWLEDGE signals.

Devices 10 and 12 are shown in the FIG. 2 embodiment of the data processing system as being interconnected by two unidirectional direction lines 42 and 44. A DIRECTION OUT signal is asserted on line 42 by device 10 and is interpreted as a DIRECTION IN signal by device 12, whereas a DIRECTION OUT signal is asserted on line 44 by device 12 and is interpreted as a DIRECTION IN signal by device 10.

In another embodiment, the burst mode asynchronous protocol can be implemented using a single bidirectional direction line that is set at one of two levels depending on which of the two devices will be transmitting data as the source.

The external interface bus may also include a burst done line and a burst enable line, as shown in FIG. 2 by lines 46 and 48. In this preferred embodiment, control A data lines 50 and control B data lines 52 also interconnect devices 10 and 12. Separate parity and synchronizing lines (not shown) may also be provided in association with the control data lines.

When devices 10 and 12 implement the burst mode protocol, the source device waits for an ACKNOWLEDGE signal on the appropriate synchronizing line to be deasserted. After the ACKNOWLEDGE signal is deasserted, each of the sixteen data words in the burst is transmitted from the source at the same rate as in a completely synchronous protocol, because the source does not wait for an ACKNOWLEDGE signal in response to each transmitted data word. The destination device uses DATA VALID signals sent by the source device on the other synchronizing line to clock in each data word in the burst.

The destination device asserts an ACKNOWLEDGE signal any time after the first data word in the burst is received but before the last data word in the burst is received. The source device will interlock and handshake with the ACKNOWLEDGE signal prior to transmitting the next burst of data. Flow control is possible because transmission of the first data word in each burst begins asynchronously. The destination device must be capable of receiving the fixed number (e.g., sixteen) of data words in the burst at the rate at which the source device asserts the DATA VALID signals.

In accordance with the invention, there is provided a device for providing high speed parallel transfer of bursts of data between the device and an external interface bus, each burst including a predetermined number of data bits in a fixed number of multibit data words. The device comprises transfer means for coupling the device to the external interface bus to transmit and receive signals on the data lines, synchronizing lines, and direction line. As embodied in the device shown in FIG. 3, the transfer means is preferably provided by buffers 54 and 56, which couple device 10 to the data/parity lines, and to the synch, direction, burst done, and burst enable lines, respectively.

Figure 3:
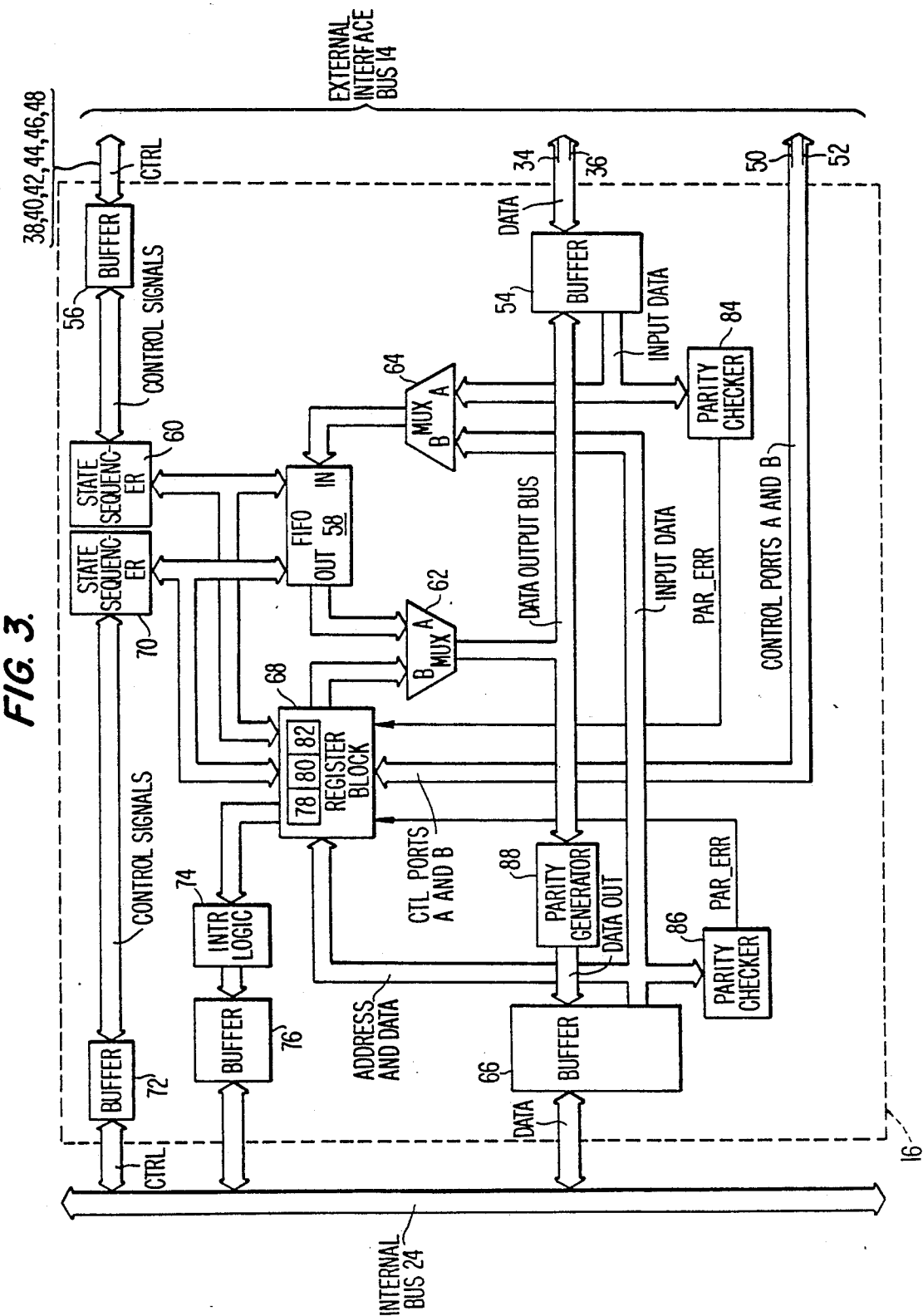
FIG. 3 is a block of one preferred embodiment of a device constructed in accordance with the present invention.

The invention includes burst register means coupled to the transfer means, including a plurality of storage elements equal to the predetermined number, for transmitting a single multibit data word from the storage elements to the data lines in response to a first control signal, and for storing a single multibit data word in the storage elements from the data lines in response to a second control signal. Preferably, the burst register means includes FIFO register means for transmitting and storing the sixteen data words, such as a FIFO register 58, as shown in FIG. 3. A FIFO register is a storage device that transmits data out of the device in the same order that the data is stored in the device. FIFO register 58 includes at least 512 storage elements in order to store each data bit in a burst consisting of sixteen thirty-two bit words. In one preferred embodiment of device 10, the burst register means also includes a number of parity storage elements for transmitting and storing parity bits corresponding to single multibit data words being transmitted and stored. In this embodiment, four parity bits are associated with each thirty-two bit data word (one parity bit for each byte of data), requiring an additional sixty-four storage elements in FIFO register 58 for transmitting and storing the parity bits corresponding to each data word in the burst.

In a preferred embodiment of FIFO register 58 in device 10, additional storage elements are included. As a result, the burst register means stores a sufficient number of data words to handle data transfers both with the external interface bus and with system bus 28, local memory 20, or processor 22. For example, if an additional 128 storage elements are provided to store four additional thirty-two bit data words, then FIFO register 58 can handle octaword (sixteen byte) data transfers with local memory 20 while also providing storage for a complete sixteen word burst of data.

In accordance with the invention, the device also includes control means coupled to the transfer means and the burst register means. Preferably, the control means for device 10 is provided by a state sequencer 60.

As embodied in the device shown in FIG. 3, state sequencer 60 provides a DIRECTION OUT signal to buffer 56 for output to direction line 42 to enable transmission of a burst to the data lines. State sequencer 60 sequentially provides sixteen first control signals per burst to FIFO register 58. The coupling of each first control signal to FIFO register 58 enables FIFO register 58 to shift out a single multibit data word to data buffer 54 via an output multiplexer 62, in order to sequentially transmit each data word in the burst from the burst register means to the transfer means. State sequencer 60 sequentially provides sixteen DATA VALID signals per burst to buffer 56 for output to first synchronizing line 38. Each DATA VALID signal is provided after a corresponding data word in the burst is sequentially transmitted from FIFO register 58, thereby enabling synchronous reception of each data word in the burst by the destination device. State sequencer 60 monitors second synchronizing line 40 and is responsive to assertion of an ACKNOWLEDGE signal on second synchronizing line 40 prior to transmission of the burst. State sequencer 60 will not provide the first control signal for the first data word in the burst to FIFO register 58 when the ACKNOWLEDGE signal is asserted, thereby preventing the first data word from being transmitted from FIFO register 58 until after the ACKNOWLEDGE signal is deasserted.

Preferably, in device 10 state sequencer 60 is responsive to assertion of a DIRECTION IN signal on direction line 44 of bus 14 to enable storage of a burst from data lines 34 of bus 14. State sequencer 60 monitors second synchronizing line 40, and sequentially provides sixteen second control signals to FIFO register 58. Each second control signal is provided in response to assertion of a corresponding DATA VALID signal on the second synchronizing line. Each second control signal is coupled to FIFO register 58 to enable the FIFO register to shift in a single multibit data word from data buffer 54 via an input multiplexer 64. The second control signals enable sequential storage of each data word in the burst in the burst register means. State sequencer 60 also asserts a single ACKNOWLEDGE signal on first synchronizing line 38 of bus 14 after receiving a DATA VALID signal corresponding to the first data word in the burst, and deasserts the ACKNOWLEDGE signal on the first synchronizing line after the 512 storage elements in FIFO register 58 are ready to store another burst of data.

Preferably, device 10, in response to receipt of the DIRECTION IN signal, will assert the ACKNOWLEDGE signal on first synchronizing line 38 of bus 14 as soon as a first DATA VALID signal corresponding to the first data word in a burst is received. Thus, unlike completely synchronous systems that use a TRANSMIT OFF signal, the burst mode asynchronous protocol provides a positive indication to the source device that the destination device is beginning to receive the transmitted data burst. Therefore, the source device can determine that a problem has occurred when an ACKNOWLEDGE signal is not asserted within a predetermined time ("timeout" period) after the first data word in a burst has been transmitted. After the 512 storage elements in FIFO register 58 have been cleared in order to store the next data burst, state sequencer 60 deasserts the ACKNOWLEDGE signal if no errors have been detected.

In a preferred embodiment of the invention, device 10 may have internal bus 24 including a number of data lines coupled to the FIFO register means and the control means, local memory 20 coupled to the internal bus, and processor 22 coupled to the internal bus, as shown in FIG. 1. As a result, device 10 can serve as an I/O processor coupled to system bus 28. Thus, data transferred to and from external interface bus 14 can be entered into memory 20 and processed (e.g., data reduction, sampling) when processor 22 is so programmed. FIFO register 58 is coupled to internal bus 24 via output multiplexer 62 or input multiplexer 64, and a data buffer 66, and can transfer data to either system bus 28, local memory 20, or processor 22.

Preferably, the control means also includes word count register means for storing the fixed number of data words in a burst as a word count prior to transfer of the burst. In one embodiment, the control means decrements the word count in the word count register means in response to the assertion of a DATA VALID signal. As a result, when the word count value equals zero, the word count register means indicates that transfer of the data burst has been completed.

In the device shown in FIG. 3, a command and status register block 68 is coupled to internal bus 24 via data buffer 66, and to external interface bus 14 via output multiplexer 62 and data buffer 54. Register block 68 is also coupled to state sequencer 60, and to another state sequencer 70 that is coupled to bus 24 via a buffer 72. As embodied in FIG. 3, command and status register block 68 in device 10 is coupled to control A data lines 50 and control B data lines 52. Register block 68 is also coupled to an interrupt request logic circuit 74, which is coupled to internal bus 24 via a buffer 76. One preferred method by which device 10 can make an interrupt request on system bus 28 is described in U.S. patent application Ser. No. 045,046, which was filed on May 1, 1987 by Douglas Williams and assigned to Digital Equipment Corporation, the assignee of the present invention. Thus, in response to certain indications in register block 68, such as the presence of a parity error, device 10 can generate interrupt requests.

Preferably, the word count register means is embodied by a word (or byte) count register 78 in register block 68. Before the first data word in a burst is transferred, register 78 is loaded with a count of sixteen words (or sixty-four bytes). The word count can be loaded into register 78 via internal bus 24 under the control of processor 22 (FIG. 1). The source of the word count may be local memory 20 or any device coupled to system bus 28. Alternately, the protocol used can require that the first data word transmitted in a burst include the word count for the burst, or that the word count be transmitted via control data lines 50 or 52 of bus 14, so that the total word count in the burst is provided by the source device to the destination device. Each time a DATA VALID signal is provided to or received from buffer 56 by state sequencer 60, state sequencer 60 decrements the word count in word count register 78. When the word count stored in register 78 equals zero, transfer of the burst has been completed. In response, state sequencer 60 in a source device prevents the first data word in the next burst from being transmitted until the ACKNOWLEDGE signal on second synchronizing line 40 of bus 14 is deasserted by the destination device. Meanwhile, state sequencer 60 in a destination device will not deassert the ACKNOWLEDGE signal before transfer of the burst has been completed. In another embodiment, an equivalent function can be performed to achieve the same results by counting and storing the number of data words transmitted or received, by comparing a previously stored word count in word count register 78 with the number actually transferred, and by indicating that transfer of the burst has been completed when the number of data words transferred matches the previously stored word count.

In a preferred embodiment of the invention, the control means provides a BURST DONE signal to the transfer means for output to a burst done line at times when a last data word in a partial burst is transmitted from the burst register means, and the control means monitors the burst done line and is responsive to the assertion of a BURST DONE signal to identify to the burst register means a last data word at times when a partial burst is transferred to the device. In the FIG. 3 embodiment, state sequencer 60 asserts the BURST DONE signal in response to certain conditions. The BURST DONE signal on line 46 is useful when a block of data is being transferred and the total number of data words in the block is not evenly divisible by the fixed number of data words in a burst. The BURST DONE signal facilitates transfer of a partial burst while still using the burst mode asynchronous protocol.

For example, in one embodiment processor 22 (FIG. 1) may load a block word count register (not shown) in command and status register block 68 with a block word count of thirty data words. A complete sixteen word burst is transmitted first, but the last burst in the block contains only fourteen data words. The destination device, however, expects to receive sixteen data words and sixteen DATA VALID signals for each burst. Therefore, when word count register 78 in the source device contains or is loaded with a word count of less than sixteen at the beginning of transmission of the last burst, state sequencer 60 will provide a BURST DONE signal for output to the destination device when the word count in word count register 78 has been decremented to zero. As a result, the destination device will not hang up the data transfer process waiting for additional data words in the partial burst, and the destination device will deassert the ACKNOWLEDGE signal even though sixteen data words were not received.

Depending on the protocol used in the embodiment of the invention implemented by the user, a block word count can be transmitted from the source device to the destination device, thereby providing another method by which the destination device can determine that the last data word in a block of data has been sent. The block word count can be transmitted as the first data word in a block, or can be separately provided via control A or B data lines 50 or 52.

In another preferred embodiment of the invention, the control means monitors a burst enable line and provides only a single first control signal to the burst register means during a data transfer from the device at times when a BURST ENABLE signal is not asserted. This operation prevents transmission of more than one multibit data word from the device until a corresponding ACKNOWLEDGE signal is asserted and deasserted on the other synch line, thereby causing data transfers to be implemented using a completely asynchronous protocol. In a preferred embodiment, a bit in a burst enable status register (not shown) in command and status register block 68 must be set in both the source and destination devices for the control means to provide a BURST ENABLE signal to the transfer means. Alternately, device 10 can be hardwired to assert the BURST ENABLE signal. If a wired-AND connection is provided from the source and destination devices to burst enable line 48, all devices connected to line 48 must assert the BURST ENABLE signal in order to enable the data processing system to implement the burst mode asynchronous protocol.

The BURST ENABLE signal may also be used in order to transfer a partial burst of data words. When used in this manner, each data word in the partial burst is transferred asynchronously. This method allows both complete and partial bursts to be transferred in an embodiment in which burst done line 46 can be removed, and any pins on devices 10 and 12 connected to line 46 can be saved.

For example, in one embodiment processor 22 may load a block word count register in command and status register block 68 with a block word count of thirty data words. A sixteen word burst is transmitted first, but the last burst in the block only contains fourteen data words. In this embodiment, when word count register 78 in the source device contains or is loaded with a word count of less than sixteen at the beginning of transmission of the last burst, the bit in the burst enable status register will not be set and state sequencer 60 will not provide a BURST ENABLE signal for output by the transfer means. Therefore, a BURST ENABLE signal will not be asserted on burst enable line 48 when each of the data words in the partial burst is being transferred. As a result, the first sixteen data words in the block are transferred using the burst mode asynchronous protocol, and each of the last fourteen data words in the block are transferred asynchronously. In response to deassertion of the BURST ENABLE signal on burst enable line 48, the control means in the destination device asserts and deasserts the ACKNOWLEDGE signal after receipt of each and every one of the data words in the partial burst, instead of only asserting and deasserting a single ACKNOWLEDGE signal for all of the data words in a burst.

In a preferred embodiment of the invention, the control means also includes mode register means for storing a bit that indicates whether the device is in a data transmission (source) mode or a data reception (destination) mode. In the embodiment of FIG. 3, command and status register block 68, which is coupled to internal bus 24 via data buffer 66 and to external interface bus 14 via output multiplexer 62 and data buffer 54, includes a mode register 80 that is loaded with a single bit. The single bit in mode register 80 is set to indicate that device 10 will be the source device during transfer of the next data burst, and is reset when device 10 will be the destination device during transfer of the next data burst. The bit in the mode register may be set by processor 22 or any device coupled to system bus 28. In response to setting of the mode register bit in the source device for the next data burst, state sequencer 60 in that device provides a DIRECTION OUT signal to buffer 56, thereby causing the DIRECTION OUT signal to be output to direction line 42. In this embodiment, the bit in mode register 80 in the destination device for the next data burst will be reset by state sequencer 60 in response to receipt of a DIRECTION IN signal by buffer 56 from direction line 44.

In the FIG. 3 embodiment of device 10, FIFO register 58 shifts in data words from data buffer 54 via input multiplexer 64, and shifts out data words to data buffer 54 via output multiplexer 62. Preferably, data buffer 54 is a bidirectional transceiver that is enabled to operate in a transmit mode when the DIRECTION OUT signal is output by the device, and is enabled to operate in a receive mode when the DIRECTION IN signal is received by the device. In response to receipt of the DIRECTION IN signal and a DATA VALID signal, input multiplexer 64 selects the "A" input lines, which couple a data word to the input of register 58 to be shifted into register 58. In a preferred embodiment, gate array 16 in device 10 includes an internal clock (not shown) used to generate DATA VALID signals at appropriate times. In response to the setting of the bit in mode register 80 and the generation of an internal clock signal, FIFO register 58 shifts out data via output multiplexer 62, which is coupled to the output of register 58 and selects the "A" input lines. In the embodiment of FIG. 3, the presence of multiplexers 62 and 64 responsive to the DIRECTION OUT and DIRECTION IN signals enables the direction of data transfer to be switched, while data flows through FIFO register 58 in a single direction.

In a preferred embodiment of device 10, the control means also includes parity error status register means for storing at least one bit that indicates whether the device has detected a parity error in a data word received from a source device (or from system bus 28). In the embodiment of FIG. 3, command and status register block 68 is coupled to state sequencers 60 and 70 and interrupt request logic 74, and includes a parity error status register 82 that is loaded with a single bit that is set whenever a parity error is detected. FIFO register 58 includes an additional sixty-four storage elements for transmitting and storing the parity bits corresponding to each data word in the burst. Preferably, parity error status register 82 in device 10 is also coupled to parity check means for monitoring the received data and parity bits and setting the bit in the parity error status register means, such as parity check circuits 84 and 86, which are respectively coupled to data buffers 54 and 66. For each data word received by device 10, the parity check circuits monitor the thirty-two data and four parity bits and determine whether a parity error exists. In response to the detection of a parity error in a received data word, the appropriate parity check circuit will set the single bit in parity error status register 82.

The use of the burst mode asynchronous protocol, as opposed to a completely synchronous protocol, reduces the time and software effort needed to recover from an error condition. For example, in response to the setting of the bit in parity error status register 82, state sequencer 60 may continue to assert the ACKNOWLEDGE signal, thereby preventing transmission of the next data burst by the source device. The control means in device 10 may also respond to setting of the parity error status register by requesting a retry of the data transfer by output of a command code on control A or B data lines 50 or 52 of bus 14. In response to a retry request from device 10, the source device, which may include logic for interpreting or decoding the retry command code, will retransmit the data burst to device 10. The retransmission can be accomplished by refilling the burst register means in the source device, loading word count register 78 in register block 68 in the source device with a word count of sixteen, and output of a code by the source device on control A or B data lines 50 or 52 of bus 14 indicating that the source device is ready to retransmit the data burst. The setting of the parity error status register may also result in generation of an interrupt by interrupt request logic 74, which can be serviced by a processor coupled to system bus 28. Additionally, extra hardware and software can be included in the source and destination devices in order to identify particular data words in a burst that were not correctly received, and to request via the control data lines retransmission of only those particular data words.

Preferably, device 10 also includes parity generator circuit 88 coupled to output multiplexer 62 and data buffers 54 and 66. Parity generator circuit 88 is utilized when a data word is being output from the burst register means to either external interface bus 14 or system bus 28 (via bus 24). In this embodiment, as each thirty-two bit data word is output from FIFO register 58, four parity bits are generated by parity generator circuit 88, which provides the parity bits output on parity lines 36 or output on system bus 28.

Figure 4:
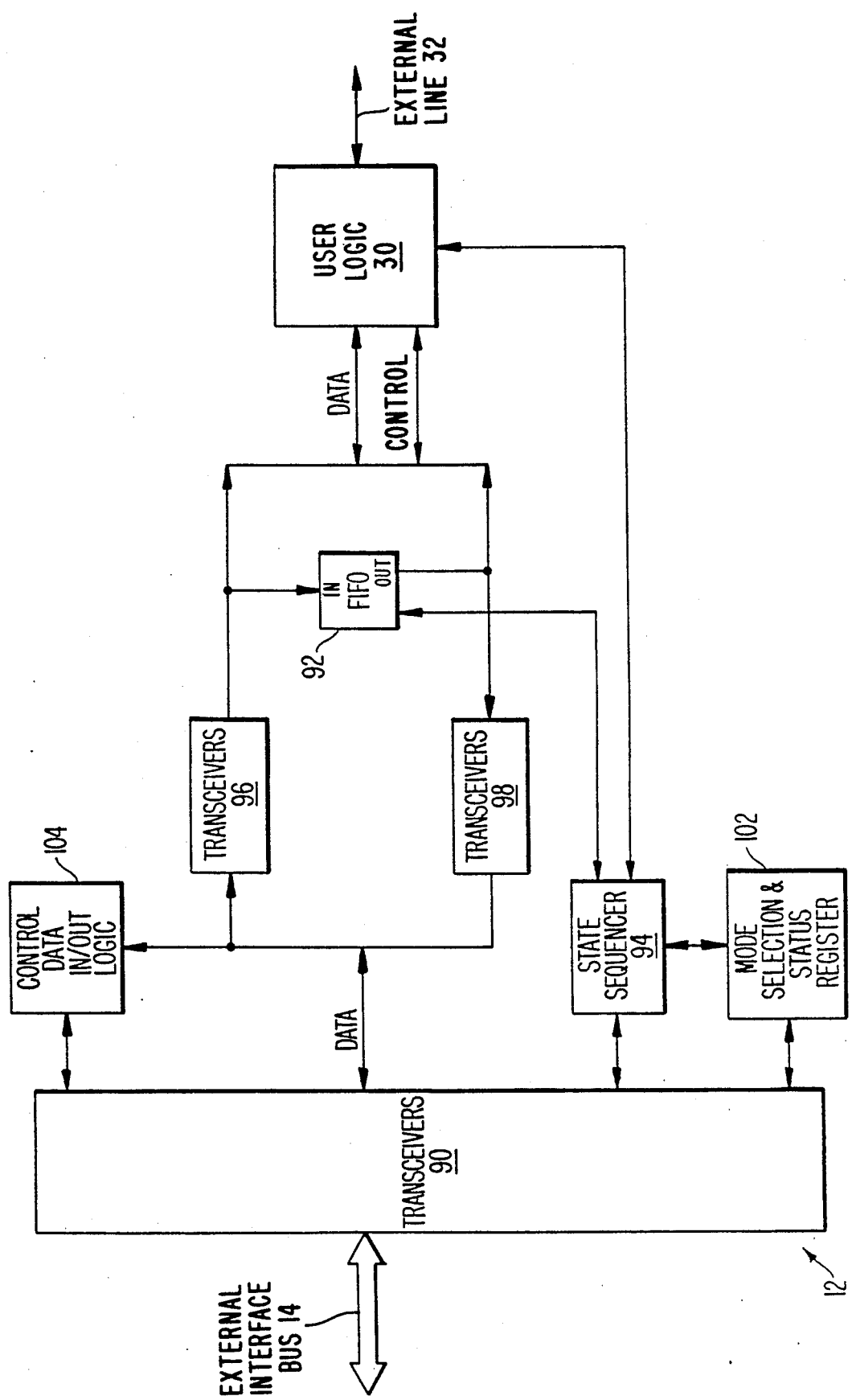
FIG. 4 is a block diagram of another preferred embodiment of a device constructed in accordance with the present invention.

Device 12 constitutes another preferred embodiment of the present invention, as shown in FIG. 4. Preferably, device 12 incorporates structures and functions similar to those previously described in detail with respect to device 10 and FIG. 3.

Preferably, the transfer means in device 12 of FIG. 4 is provided by transceivers 90, which couple device 10 to the data/ parity, synch, direction, burst done, burst enable, and control data lines of external interface bus 14. In the preferred embodiment, the burst register means includes a FIFO register 92. The control means is provided by a state sequencer 94.

As embodied in the device shown in FIG. 4, transceivers 96 and 98 couple FIFO register 92 with transceivers 90, thereby enabling a single multibit data word to be transferred in either direction between the burst register means embodied by FIFO register 92 and the transfer means embodied by transceivers 90. The use of transceivers 96 and 98 results in a tristate bus for changing the direction of data transfer between transceivers 90 and FIFO register 92, instead of the multiplexers used in the FIG. 3 embodiment of device 10. Preferably, transceiver 96 includes parity check means for monitoring the thirty-two data and four priority bits received from external interface bus 14 and for detecting whether a parity error exists. In the preferred embodiment of transceiver 98, a parity generator circuit is provided. When a thirty-two bit data word is being transferred from FIFO register 92 to external interface bus 14, transceiver 98 generates four parity bits for output on the parity lines.

Preferably, device 12 includes mode selection means, coupled to the control means and to user logic 30, for designating a selected operating mode for user logic 30 and device 12. In the embodiment of FIG. 4, the mode selection means in device 12 includes mode selection and status register 102. Mode selection and status register 102 is coupled to the control B data lines of external interface bus 14 via transceiver 90, and to state sequencer 94. In the preferred embodiment, the protocol for the data processing system can require that mode selection data be loaded into register 102 from a device coupled to bus 14 via control B data lines 52.

Device 12 may be utilized as a controller for a storage device, such as a disk or tape. Device 12 may also be utilized to provide an interface for a data processing system to a number of other systems via serial links.

Preferably, in device 12 the first control signal from the control means is coupled to the FIFO register means to enable the FIFO register means to read out a single multibit data word to the transfer means, and the second control signal is coupled to the FIFO register means to enable the FIFO register means to write in a single multibit data word from the transfer means. As embodied in device 12, FIFO register 92 is a dual port RAM and is responsive to read and write signals received from state sequencer 94.

The control means in device 12 may also include word count register means, mode register means, and parity error status register means, which can have the structure and operation detailed previously for device 10, and are thus not shown in FIG. 4. Preferably, the control means in device 12 also provides and monitors BURST ENABLE and BURST DONE signals with external interface bus 14.

Additionally, control data in/out logic 104 may be provided in device 12 for coupling FIFO register 92 to the control A data lines via transceivers 90. As a result, protocol data, such as a word count or retry request, can be transmitted over control A data lines 50.

Figure 5:
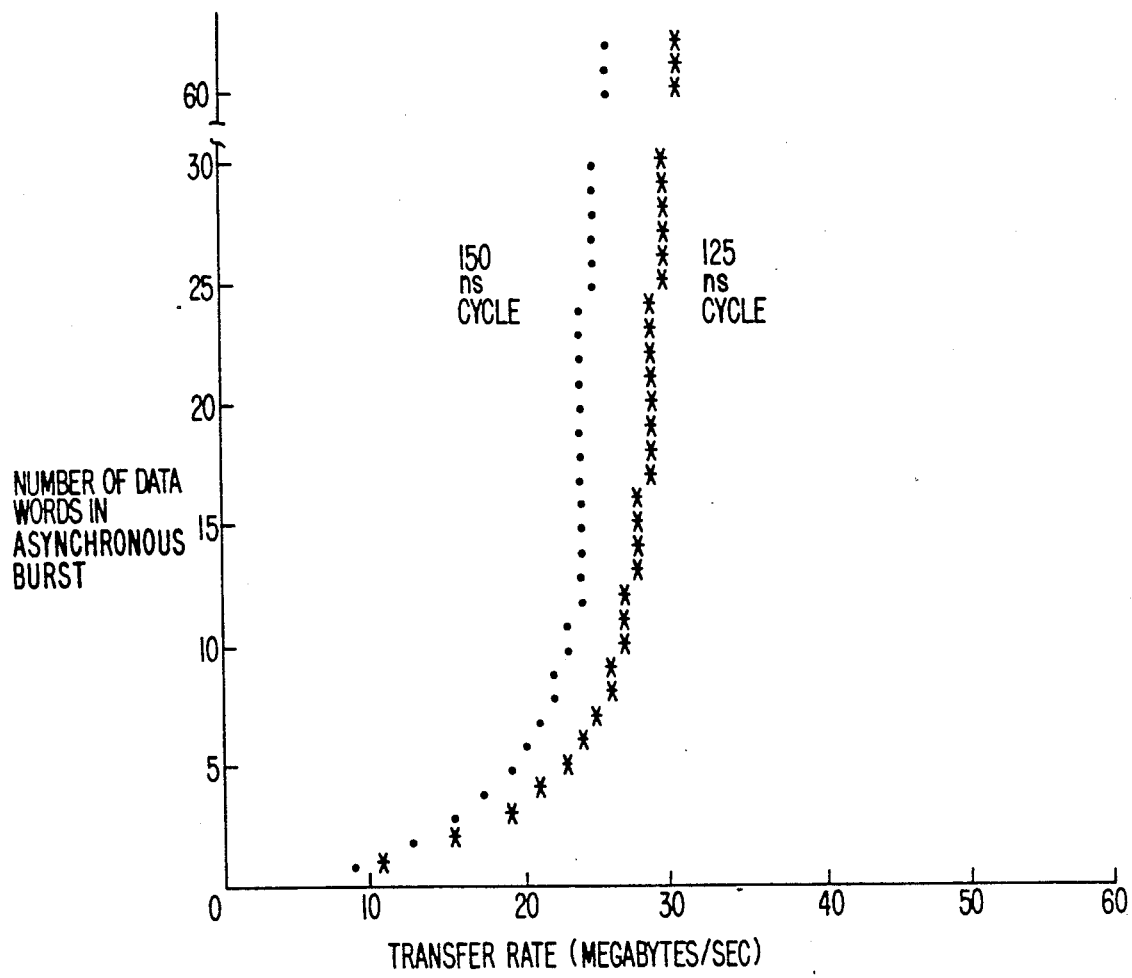
FIG. 5 is a graph illustrating the improvement in data transfer rates when a burst mode asynchronous protocol is utilized.

The graph in FIG. 5 illustrates the improved data transfer rates for burst mode asynchronous protocols compared to completely asynchronous protocols. The graph shows the expected data transfer rates (in megabytes per second) as the fixed number of data words in a burst is varied. The transfer rates will be lower when fewer words are included in a burst because more time is required for handshaking with the additional ACKNOWLEDGE signals. However, diminishing returns are obtained as the number of data words in a burst is increased—most of the potential improvement in speed can be achieved using sixteen or thirty-two data word bursts. The relatively slow speed for completely asynchronous protocols is depicted at the bottom of FIG. 5, which shows the expected transfer rates when an ACKNOWLEDGE signal is required after each data word (i.e., only one data word in burst).

As shown in FIG. 5, a large proportion of the time required for data transfer is dedicated to handshaking. As a result, performance is improved when fewer handshakes are required during transfers of a block of data. For each data burst transferred, the waiting time associated with assertion and deassertion of an ACKNOWLEDGE signal is divided by the fixed number of data words in a burst.

In a preferred embodiment of the invention, the DATA VALID and control signals used in clocking in data are provided approximately every seventy-five to eighty nanoseconds. This is a relatively fast cycle time compared with the slow cycle times of approximately 150 nanoseconds shown in FIG. 5. In such a preferred embodiment, use of sixteen or thirty-two data words per burst can result in data transfer rates as fast as forty-six megabytes per second. This high speed using the burst mode asynchronous protocol is only slightly slower than the expected fifty megabytes per second data transfer rate for a completely synchronous protocol, and provides for better flow control and easier error recovery.

It will be apparent to those skilled in the art that various modifications and variations can be made in the methods and apparatus of the present invention without departing from the scope or spirit of the invention. As an example, equivalent functions to those executed by the circuitry described in this specification can be performed by the execution of instructions by programmable processors. Similarly, various uses exist for the invention in different environments (e.g., devices can be in the same cabinet or can be connected by cable). Thus, it is intended that the present invention cover the modifications and variations of this invention provided they come within the scope of the appended claims and their equivalents.

What is claimed is:

1. A device for providing high speed parallel transfer of bursts of data between the device and an external interface bus, each burst including a predetermined number of data bits in a fixed number of multibit data words, the external interface bus including a plurality of data lines, with each data line corresponding to one bit in a data word being transferred, and the external interface bus also including a first and second synchronizing line carrying ACKNOWLEDGE and DATA VALID signals, and a direction line, the device comprising:

transfer means for coupling the device to the external interface bus to transmit and receive signals on the data lines, synchronizing lines, and direction line;

burst register means coupled to the transfer means, including a plurality of storage elements equal to the predetermined number, for transmitting a single multibit data word from the storage elements to the data lines in response to a first control signal, and for storing a single multibit data word in the storage elements from the data lines in response to a second control signal; and control means coupled to the transfer means and the burst register means, for providing a DIRECTION OUT signal to the transfer means for output to the direction line to enable transmission of a burst of data to the data lines, for sequentially providing a plurality of first control signals equal to the fixed number to the burst register means to sequentially transmit each data word of the burst from the burst register means to the transfer means, and for sequentially providing a plurality of DATA VALID signals equal to the fixed number to the transfer means for output to one of the synchronizing lines, each DATA VALID signal being provided to the transfer means after a corresponding data word in the burst is sequentially transmitted from the burst register means, to enable synchronous reception of each data word in the burst, the control means monitoring the other synchronizing line and being responsive to assertion of an ACKNOWLEDGE signal on the other synchronizing line prior to transmission of the burst to prevent a first data word in the burst from being transmitted from the burst register means until after the ACKNOWLEDGE signal is deasserted; and the control means being responsive to assertion of a DIRECTION IN signal on the direction line to enable storage of a burst from the data lines, for monitoring one of the synchronizing lines, for sequentially providing a plurality of second control signals equal to the fixed number to the burst register means, each second control signal being provided to the burst register means in response to assertion of a corresponding DATA VALID signal on the one synchronizing line to sequentially store each data word of the burst in the burst register means, for asserting a single ACKNOWLEDGE signal on the other synchronizing line after receiving a DATA VALID signal corresponding to a first data word in the burst, and for deasserting the ACKNOWLEDGE signal on the other synchronizing line after the predetermined number of storage elements in the burst register means are ready to store another burst of data.

2. A device in accordance with claim 1, in which the burst register means comprises a FIFO register means for transmitting and storing the fixed number of multibit data words.

3. A device in accordance with claim 2, in which the FIFO register means reads out a single multibit data word to the transfer means in response to the coupling of each first control signal to the FIFO register means, and the FIFO register means writes in a single multibit data word from the transfer means in response to the coupling of each second control signal to the FIFO register means.

4. A device in accordance with claim 2, in which the FIFO register means shifts out a single multibit data word to the transfer means in response to the coupling of each first control signal to the FIFO register means, and the FIFO register means shifts in a single multibit data word from the transfer means in response to the coupling of each second control signal to the FIFO register means.

5. A device in accordance with claim 4, in which the control means comprises a state sequencer.

6. A device in accordance with claim 4, in which the device comprises a controller for a storage device.

7. A device in accordance with claim 1, in which the control means comprises a state sequencer.

8. A device in accordance with claim 1, in which the device comprises a controller for a storage device.

9. A device in accordance with claim 1, and further comprising mode selection means for designating a selected operating mode for the device.

10. A device in accordance with claim 1, and further comprising:
an internal bus including a second plurality of data lines coupled to the burst register means and the control means;
a local memory coupled to the internal bus; and
a processor coupled to the internal bus.

11. A device in accordance with claim 1, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst of data by a word count value of zero.

12. A device in accordance with claim 1, in which the control means further comprises mode register means for storing a bit that indicates whether the device is in a data transmission mode or a data reception mode.

13. A device in accordance with claim 12, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

14. A device in accordance with claim 1, in which the external interface bus includes a burst enable line, and the control means monitors the burst enable line and provides only a single first control signal to the burst register means during a data transfer from the device, at times when a BURST ENABLE signal is not asserted, to prevent transmission of more than one multibit data word from the device until after a corresponding ACKNOWLEDGE signal is asserted and deasserted on the other synchronizing line.

15. A device in accordance with claim 14, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

16. A device in accordance with claim 14, in which the external interface bus includes a burst done line, and the control means provides a BURST DONE signal to the transfer means for output to the burst done line at times when a last data word in a partial burst is transmitted from the burst register means, and the control means monitors the burst done line and is responsive to the assertion of a BURST DONE signal to identify to the burst register means a last data word at times when a partial burst is transferred to the device.

17. A device in accordance with claim 16, in which the external interface bus further includes a parity line carrying a parity bit to indicate the parity of a multibit data word on the data lines, wherein:
the transfer means transmits and receives parity bits on the parity line; and
the burst register means includes a plurality of parity storage elements for transmitting and storing parity bits corresponding to single multibit data words being transmitted and stored.

18. A device in accordance with claim 17, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

19. A device in accordance with claim 16, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

20. A device in accordance with claim 1, in which the external interface bus includes a burst done line, and the control means provides a BURST DONE signal to the transfer means for output to the burst done line at times when a last data word in a partial burst is transmitted from the burst register means, and the control means monitors the burst done line and is responsive to the assertion of a BURST DONE signal to identify to the burst register means a last data word at times when a partial burst is transferred to the device.

21. A device in accordance with claim 20, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

22. A device in accordance with claim 20, in which the external interface bus further includes a parity line carrying a parity bit to indicate the parity of a multibit data word on the data lines, wherein:
the transfer means transmits and receives parity bits on the parity line; and
the burst register means includes a plurality of parity storage elements for transmitting and storing parity bits corresponding to single multibit data words being transmitted and stored.

23. A device in accordance with claim 22, in which the device comprises a controller for a storage device.

24. A device in accordance with claim 23, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

25. A device in accordance with claim 22, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

26. A device in accordance with claim 1, in which the external interface bus further includes a parity line carrying a parity bit to indicate the parity of a multibit data word on the data lines, wherein:
the transfer means transmits and receives parity bits on the parity line; and
the burst register means includes a plurality of parity storage elements for transmitting and storing parity bits corresponding to single multibit data words being transmitted and stored.

27. A device in accordance with claim 26, in which:
the control means further comprises parity error status register means for storing a bit that indicates whether the device has detected a parity error in a data word received by the device; and
the device further comprises parity check means, coupled to the transfer means and the control means, for monitoring the received data bits and parity bits, and for setting the bit in the parity error status register means in response to the detection of a parity error in the received data word.

28. A device in accordance with claim 27, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

29. A device in accordance with claim 26, in which the control means further comprises word count register means for storing the fixed number as a word count prior to transfer of a burst, and the control means decrements the word count in the word count register means in response to the assertion of a DATA VALID signal, wherein the word count register means indicates completion of transfer of a burst by a word count value of zero.

30. A process for providing high speed parallel transfer of bursts of data via an external interface bus between a first device and a second device, each burst including a predetermined number of data bits in a fixed number of multibit data words, each device including a plurality of storage elements equal in number to the predetermined number for storing each burst of data, and the external interface bus including a first and second synchronizing line carrying ACKNOWLEDGE and DATA VALID signals, a direction line for control of data transfer, and a plurality of data lines each corresponding to one bit in a data word being transferred, the process comprising the steps of:
transmitting a DIRECTION OUT signal from the first device to the second device on the direction line;
monitoring the second synchronizing line by the first device to determine whether an ACKNOWLEDGE signal is being asserted by the second device;
sequentially transmitting a plurality of data words equal to the fixed number in a burst from the storage elements in the first device to the data lines, with the first data word in the burst not being transmitted at times when an ACKNOWLEDGE signal is being asserted by the second device;
sequentially transmitting a plurality of DATA VALID signals equal to the fixed number from the first device to the first synchronizing line, each DATA VALID signal being transmitted after transmission of a corresponding data word in the burst and prior to transmission of a subsequent data word in the burst;

monitoring the first synchronizing line by the second device to determine whether a DATA VALID signal is being transmitted by the first device;

sequentially storing each data word in the burst into the storage elements in the second device at times when a DATA VALID signal is being transmitted by the first device;

asserting a single ACKNOWLEDGE signal by the second device on the second synchronizing line after a DATA VALID signal is transmitted from the first device corresponding to the first data word in the burst; and deasserting the single ACKNOWLEDGE signal by the second device after the predetermined number of storage elements in the second device are ready to store another burst of data.

31. A process for providing high speed parallel transfer of a partial burst of data via an external interface bus between a first device and a second device, wherein a burst includes a predetermined number of data bits in a fixed number of multibit data words, and wherein each device includes a plurality of storage elements equal in number to the predetermined number for storing a burst of data, and the external interface bus includes a first and second synchronizing line carrying ACKNOWLEDGE and DATA VALID signals, a direction line for control of data transfer, a burst done line, and a plurality of data lines each corresponding to one bit in a data word being transferred, the process comprising the steps of:

transmitting a DIRECTION OUT signal from the first device to the second device on the direction line;

monitoring the second synchronizing line by the first device to determine whether an ACKNOWLEDGE signal is being asserted by the second device;

sequentially transmitting a plurality of data words equal to a number less than the fixed number in a partial burst from the storage elements in the first device to the data lines, with the first data word in the partial burst not being transmitted at times when an ACKNOWLEDGE signal is being asserted by the second device;

sequentially transmitting a plurality of DATA VALID signals equal to the number less than the fixed number from the first device to the first synchronizing line, each DATA VALID signal being transmitted after transmission of a corresponding data word in the partial burst and prior to transmission of a subsequent data word in the partial burst;

transmitting a BURST DONE signal from the first device to the second device on the burst done line at times when a last data word in the partial burst is transmitted from the storage elements in the first device to the data lines;

monitoring the first synchronizing line by the second device to determine whether a DATA VALID signal is being transmitted by the first device;

sequentially storing each data word in the partial burst into the storage elements in the second device at times when a DATA VALID signal is being transmitted by the first device;

asserting a single ACKNOWLEDGE signal by the second device on the second synchronizing line after a DATA VALID signal is transmitted from the first device corresponding to the first data word in the partial burst;

monitoring the burst done line by the second device to determine whether a BURST DONE signal is being transmitted by the first device; and deasserting the single ACKNOWLEDGE signal by the second device after a BURST DONE signal is transmitted from the first device corresponding to the last data word in the partial burst and after the predetermined number of storage elements in the second device are ready to store a burst of data.

32. A process for providing high speed parallel transfer of bursts of data via an external interface bus between a first device and a second device, each burst including a predetermined number of data bits in a fixed number of multibit data words, each device including a plurality of storage elements equal in number to the predetermined number for storing each burst of data, and the external interface bus including a first and second synchronizing line carrying ACKNOWLEDGE and DATA VALID signals, a direction line for control of data transfer, and a plurality of data lines each corresponding to one bit in a data word being transferred, the process comprising the steps of:

transmitting a DIRECTION OUT signal from the first device to the second device on the direction line during a first transfer;

monitoring the second synchronizing line by the first device to determine whether an ACKNOWLEDGE signal is being asserted by the second device during the first transfer;

sequentially transmitting a plurality of data words equal to the fixed number in a burst from the storage elements in the first device to the data lines, with the first data word in the burst not being transmitted at times when an ACKNOWLEDGE signal is being asserted by the second device during the first transfer;

sequentially transmitting a plurality of DATA VALID signals equal to the fixed number from the first device to the first synchronizing line, each DATA VALID signal being transmitted after transmission of a corresponding data word in the burst and prior to transmission of a subsequent data word in the burst during the first transfer;

monitoring the first synchronizing line by the second device to determine whether a DATA VALID signal is being transmitted by the first device during the first transfer;

sequentially storing each data word in the burst into the storage elements in the second device at times when a DATA VALID signal is being transmitted by the first device during the first transfer;

asserting a single ACKNOWLEDGE signal by the second device on the second synchronizing line after a DATA VALID signal is transmitted from the first device corresponding to the first data word in the burst during the first transfer;

deasserting the single ACKNOWLEDGE signal by the second device after the predetermined number of storage elements in the second device are ready to store another burst of data during the first transfer;

transmitting a DIRECTION OUT signal from the second device to the first device on the direction line during a second transfer;

monitoring the first synchronizing line by the second device to determine whether an ACKNOWLEDGE signal is being asserted by the first device during the second transfer;

sequentially transmitting a plurality of data words equal to the fixed number in a burst from the storage elements in the second device to the data lines, with the first data word in the burst not being transmitted at times when an ACKNOWLEDGE signal is being asserted by the first device during the second transfer;

sequentially transmitting a plurality of DATA VALID signals equal to the fixed number from the second device to the second synchronizing line, each DATA VALID signal being transmitted after transmission of a corresponding data word in the burst and prior to transmission of a subsequent data word in the burst during the second transfer;

monitoring the second synchronizing line by the first device to determine whether a DATA VALID signal is being transmitted by the second device during the second transfer;

sequentially storing each data word in the burst into the storage elements in the first device at times when a DATA VALID signal is being transmitted by the second device during the second transfer;

asserting a single ACKNOWLEDGE signal by the first device on the first synchronizing line after a DATA VALID signal is transmitted from the second device corresponding to the first data word in the burst during the second transfer; and deasserting the single ACKNOWLEDGE signal by the first device after the predetermined number of storage elements in the first device are ready to store another burst of data during the second transfer.

33. A process for providing high speed parallel transfer of a partial burst of data via an external interface bus between a first device and a second device, wherein a burst includes a predetermined number of data bits in a fixed number of multibit data words, and wherein each device includes a plurality of storage elements equal in number to the predetermined number for storing a burst of data, and the external interface bus includes a first and second synchronizing line carrying ACKNOWLEDGE and DATA VALID signals, a direction line for control of data transfer, a burst done line, and a plurality of data lines each corresponding to one bit in a data word being transferred, the process comprising the steps of:

transmitting a DIRECTION OUT signal from the first device to the second device on the direction line during a first transfer;

monitoring the second synchronizing line by the first device to determine whether an ACKNOWLEDGE signal is being asserted by the second device during the first transfer;

sequentially transmitting a plurality of data words equal to a number less than the fixed number in a partial burst from the storage elements in the first device to the data lines, with the first data word in the partial burst not being transmitted at times when an ACKNOWLEDGE signal is being asserted by the second device during the first transfer;

sequentially transmitting a plurality of DATA VALID signals equal to the number less than the fixed number from the fist device to the first synchronizing line, each DATA VALID signal being transmitted after transmission of a corresponding data word in the partial burst and prior to transmission of a subsequent data word in the partial burst during the first transfer;

transmitting a BURST DONE signal from the first device to the second device on the burst done line at times when a last data word in the partial burst is transmitted from the storage elements in the first device to the data lines during the first transfer;

monitoring the first synchronizing line by the second device to determine whether a DATA VALID signal is being transmitted by the first device during the first transfer;

sequentially storing each data word in the partial burst into the storage elements in the second device at times when a DATA VALID signal is being transmitted by the first device during the first transfer;

asserting a single ACKNOWLEDGE signal by the second device on the second synchronizing line after a DATA VALID signal is transmitted from the first device corresponding to the first data word in the partial burst during the first transfer;

monitoring the burst done line by the second device to determine whether a BURST DONE signal is being transmitted by the first device during the first transfer;

deasserting the single ACKNOWLEDGE signal by the second device after a BURST DONE signal is transmitted from the first device corresponding to the last data word in the partial burst and after the predetermined number of storage elements in the second device are ready to store a burst of data during the first transfer;

transmitting a DIRECTION OUT signal from the second device to the first device on the direction line during a second transfer;

monitoring the first synchronizing line by the second device to determine whether an ACKNOWLEDGE signal is being asserted by the first device during the second transfer;

sequentially transmitting a plurality of data words equal to a number less than the fixed number in a partial burst from the storage elements in the second device to the data lines, with the first data word in the partial burst not being transmitted at times when an ACKNOWLEDGE signal is being asserted by the first device during the second transfer;

sequentially transmitting a plurality of DATA VALID signals equal to the number less than the fixed number from the second device to the second synchronizing line, each DATA VALID signal being transmitted after transmission of a corresponding data word in the partial burst and prior to transmission of a subsequent data word in the partial burst during the second transfer;

transmitting a BURST DONE signal from the second device to the first device on the burst done line at times when a last data word in the partial burst is transmitted from the storage elements in the second device to the data lines during the second transfer;

monitoring the second synchronizing line by the first device to determine whether a DATA VALID signal is being transmitted by the second device during the second transfer;

sequentially storing each data word in the partial burst into the storage elements in the first device at times when a DATA VALID signal is being transmitted by the second device during the second transfer;

asserting a single ACKNOWLEDGE signal by the first device on the first synchronizing line after a DATA VALID signal is transmitted from the second device corresponding to the first data word in the partial burst during the second transfer;

monitoring the burst done line by the first device to determine whether a BURST DONE signal is being transmitted by the second device during the second transfer; and deasserting the single ACKNOWLEDGE signal by the first device after a BURST DONE signal is transmitted from the second device corresponding to the last data word in the partial burst and after the predetermined number of storage elements in the first device are ready to store a burst of data during the second transfer.

* * * * *